United States Patent
Sammataro et al.

(10) Patent No.: US 6,861,836 B2
(45) Date of Patent: Mar. 1, 2005

(54) BEARING OVERTEMPERATURE INDICATOR

(75) Inventors: Stephen R. Sammataro, Madison, CT (US); Michael F. Mullen, Cheshire, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 85 days.

(21) Appl. No.: 10/252,892

(22) Filed: Sep. 23, 2002

(65) Prior Publication Data

US 2004/0056772 A1 Mar. 25, 2004

(51) Int. Cl.$^7$ .......................... G01R 33/12; G01N 27/74
(52) U.S. Cl. ...................... 324/200; 324/204; 324/260; 324/226; 374/57; 374/160; 340/631; 340/682; 340/584
(58) Field of Search ................................ 324/226, 260, 324/204, 200, 71.1, 227; 374/56–57, 160; 340/631, 682, 584, 636.18; 204/38–40; 210/695; 244/17.11; 384/415, 448

(56) References Cited

U.S. PATENT DOCUMENTS

| | | | | | |
|---|---|---|---|---|---|
| 3,442,249 | A | * | 5/1969 | Jamison et al. | 116/217 |
| 4,119,284 | A | * | 10/1978 | Belmont | 246/169 A |
| 4,516,520 | A | * | 5/1985 | Whaley | 116/217 |
| 4,598,280 | A | * | 7/1986 | Bradford | 340/631 |
| 4,812,826 | A | * | 3/1989 | Kaufman et al. | 340/682 |
| 5,384,535 | A | * | 1/1995 | Mayeur | 324/204 |
| 5,583,441 | A | * | 12/1996 | Bitts | 324/553 |
| 5,742,234 | A | * | 4/1998 | Owen | 340/631 |
| 5,779,364 | A | * | 7/1998 | Cannelongo et al. | 374/160 |
| 5,811,664 | A | * | 9/1998 | Whittington et al. | 73/53.07 |
| 5,896,034 | A | * | 4/1999 | Marshall | 324/700 |

* cited by examiner

Primary Examiner—Jay Patidar
(74) Attorney, Agent, or Firm—Bachman & LaPointe, P.C.

(57) ABSTRACT

A non-ferrous component comprising a thermally-affected adhesive applied to a surface of the component, and at least one ferrous metal wire attached to the surface of the component by the thermally-affected adhesive.

27 Claims, 2 Drawing Sheets

BEARING OVERTEMPERATURE INDICATOR

BACKGROUND OF THE INVENTION (1) Field of the Invention

The present invention relates to a method for detecting thermal indications of failure in non-ferrous components using magnetic detectors. More specifically, the present invention relates to a method of adhering ferrous metal wires via a thermally-activated adhesive to a gearbox component, as well as the apparatus thus formed, such that the wires are detached and are detectable when a threshold temperature is reached.

(2) Description of Related Art

Detection of impending failure of gearbox components is a necessity for safe operation of aircraft. The most common approach to failure detection is by use of a magnetic chip detector. The detector collects magnetic particles caused by degradation of components in a single module, such as in a transmission system, and triggers a warning light or other signal indicative of a possible failure in the module. One shortcoming of this approach is that the component failure must be advanced to the point of physical damage (making chips) to be detected. Occasionally this does not afford the pilot enough time to make a safe emergency landing.

A key to the chip detector's operation is the presence of magnetic material. When a single magnetic chip, or a collection of smaller chips, are of a size sufficient to bridge a gap in the magnetic chip detector, a current path is formed that provides for detection of the presence of the chip or chips. Recent developments in bearing technology have resulted in bearings with non-ferrous roller cages. In some applications these cages are manufactured out of bronze, nylon, composites or PEEK plastic. Because these materials are non-ferrous, a failure of a cage made from these materials, which is a known failure mode, is non-detectable. Failure must progress to the point of degradation of the ferrous metal (rolling element) parts of the bearing to be detected. In addition, operation of the magnetic chip detector indicates a part failure in a module but is unable to provide guidance as to which gearbox component in the module is experiencing failure.

What is therefore needed is a method to allow for failure detection of non-ferrous gearbox components. Preferably, such detection would occur prior to total mechanical failure of the component. In addition, it is preferable that such a method permit the identification of a singular component experiencing failure from amongst a plurality of components comprising a module.

SUMMARY OF THE INVENTION

Accordingly, it is an object of the present invention to provide a gearbox component formed by adhering ferrous metal wires via a thermally-activated adhesive to a component.

It is a further object of the present invention to provide a method for detecting thermal indications of failure in non-ferrous components using magnetic detectors.

In accordance with the present invention, a non-ferrous component comprises a thermally-affected adhesive applied to a surface of the component, and at least one ferrous metal wire attached to the surface of the component by the thermally-affected adhesive.

In accordance with the present invention, a method of magnetically detecting thermal degradation of components comprises the steps of applying a thermally-affected adhesive to a surface of the component wherein the thermally-affected adhesive breaks down at a temperature threshold, attaching a plurality of ferrous metal wires to the component via the thermally-affected adhesive, and detecting the detachment of at least one of the plurality of ferrous metal wires detached from the component.

In accordance with the present invention, a helicopter, comprising at least one module comprising at least one gearbox component, comprises a thermally-affected adhesive applied to a surface of said gearbox component, and at least one ferrous metal wire attached to said surface of said gearbox by said thermally-affected adhesive.

DETAILED DESCRIPTION OF THE PREFERRED EMBODIMENT(S)

The present invention provides a method whereby early warning of non-ferrous gearbox component failure, such as of a bearing cage, is achieved by using a thermally-activated ferrous metal debris generator. A precursor to many bearing failures is an increase in operating temperature. The increase in temperature is most often the result of metal on metal contact such as that experienced during a cage failure where element-to-element contact, sliding, and skidding will occur. The present invention therefore provides a method of configuring a gearbox component such that an increase in the component's temperature indicative of an impending failure can be identified and acted upon prior to failure.

Figure 1:
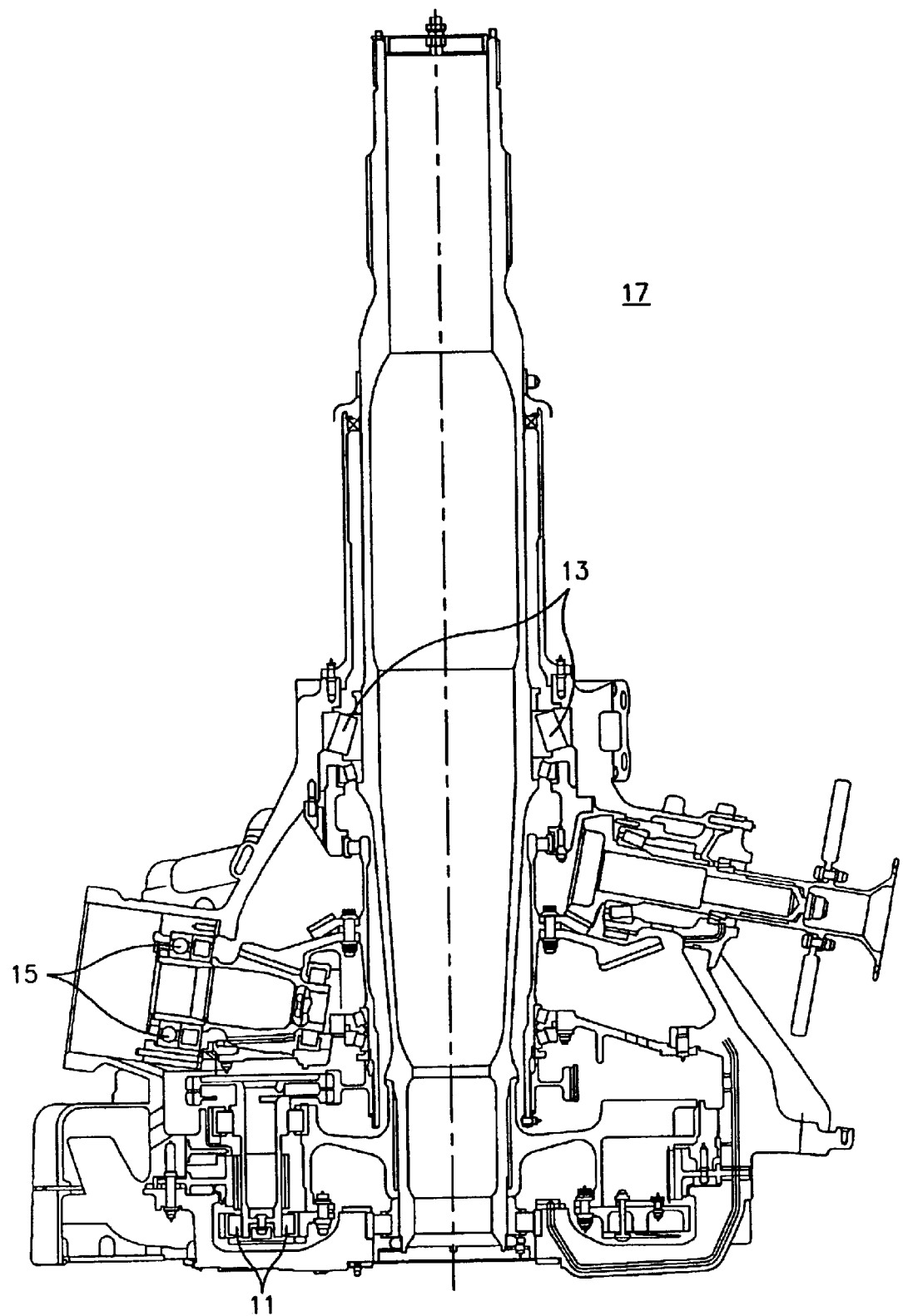
FIG. 1 A schematic diagram of a helicopter transmission system showing a plurality of bearing assemblies.

With reference to FIG. 1, there is illustrated the orientation of a plurality of differing types of bearing elements arranged in a helicopter power transmission system 17. Such a power transmission system 17 comprises a single module. There is illustrated various types of roller bearings which may be incorporated in a single module. Specifically, there are illustrated tapered roller bearings 13, ball bearings 15 and cylindrical roller bearings 11. In the present example, a continual flow of lubrication travels in a circuit passing through each bearing assembly 11, 13, 15. In operation, the lubrication passes by a magnetic chip detector (not shown) as it passes repeatedly throughout the circuit.

Figure 2:
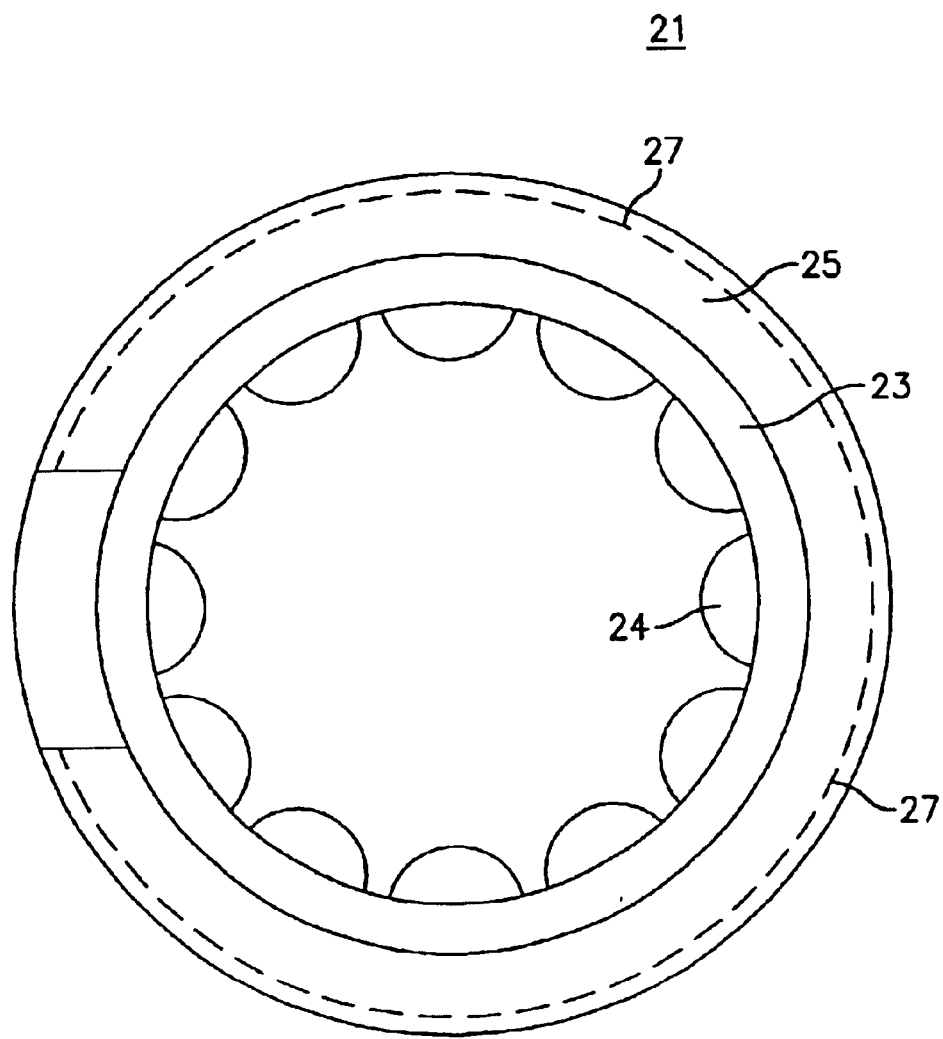
FIG. 2 A diagram of a bearing assembly showing the ferrous metal wires of the present invention.

A central feature of the present invention is to attach thin ferrous metal wire pieces to the outboard surface of a bearing component using a thermally-affected adhesive which will release the pieces when a desired temperature is reached. With reference to FIG. 2, there is illustrated in detail a roller bearing assembly 21 of the present invention. While illustrated with respect to a cylindrical roller bearing assembly, the present invention is drawn broadly to encompass any such bearing assembly or bearing assembly component. Bearing assembly 21 is comprised of roller elements 24, cage or retainer 23, and outer ring 25. The inner ring is not shown.

In the present example, a plurality of ferrous metal wires 27 are dispersed about the outer edge of outer ring 25 and attached via a thermally-activated adhesive. In operation, the ferrous metal wires 27 may be attached in any desired manner to any component of the bearing assembly 21 likely to experience increased temperatures prior to a bearing failure. Likewise, ferrous metal wires 27 may be attached to any surface of any gearbox component, part, or assembly of parts likely to experience increased temperatures prior to a bearing failure. Ideally, ferrous metal wires 27 are attached to parts comprised of non-ferrous materials the degradation of which would normally not be detected by a magnetic chip detector. Such non-ferrous materials include, but are not limited to, titanium, bronze, aluminum, nylon, composites, PEEK plastics, brass, magnesium, and combinations thereof.

The thermally-activated adhesive is chosen so as to lose an amount of adhesion sufficient to release one or more ferrous metal wires 27 when a threshold temperature, indicative of imminent failure, is reached. As the component to which the ferrous metal wires 27 have been attached passes through the threshold temperature of the thermally-activated adhesive, the ferrous metal wires 27 are released, pass through the lubrication system, and are collected by the magnetic chip detector generating an early signal that a bearing failure is imminent.

The ferrous metal wires 27 must be sized so that they are small enough to be easily carried to the detector, but not so small as to be able to be "burned off" using the chip detector fuzz burn feature. A preferred diameter for the ferrous metal wires 27 is between 0.003 inches and 0.020 inches. Most preferably the diameter is between 0.010 inches and 0.015 inches. Similarly, the preferred length of each ferrous metal wire 27 is between 0.005 inches and 0.150 inches. Most preferably the length is between 0.070 inches and 0.130 inches.

It is of use to vary the length, diameter, chemical composition, and color of the ferrous metal wires amongst a plurality of bearing assemblies 21 comprising a single module while maintaining uniformity amongst the ferrous metal wires 27 attached to any single bearing assembly 27. In this manner, examination of the ferrous metal wires 27 collected by the magnetic chip detector can determine which bearing assembly 21 is experiencing temperatures in excess of the temperature threshold.

This approach to bearing failure detection may be applied to bearings with cages made of any material, including PEEK. In addition, the application of ferrous metal wires 27 may be extended to any component likely to experience elevated temperatures as an indicator of possible failure or malfunction.

What is claimed is:

1. A component, comprising:
a thermally-affected adhesive applied to a surface of said component;
at least one ferrous metal wire attached to said surface of said component by said thermally-affected adhesive; and
wherein said at least one ferrous metal wire is of a length sufficient to be detected by a magnetic detector said length further sufficient so as not to be burned off by a fuzz burn feature of said magnetic detector.

2. The component of claim 1, wherein said at least one ferrous metal wire is between 0.05 and 0.15 inches in length.

3. The component of claim 1, wherein said at least one ferrous metal wire is between 0.07 and 0.13 inches in length.

4. The component of claim 1, wherein a diameter of said at least one ferrous metal wire is between 0.003 and 0.020 inches.

5. The component of claim 1, wherein a diameter of said at least one ferrous metal wire is between 0.010 and 0.015 inches.

6. The component of claim 1, wherein each of said at least one ferrous metal wire is of uniform length.

7. The component of claim 1, wherein each of said at least one ferrous metal wire is of uniform diameter.

8. The component of claim 1, wherein each of said at least one ferrous metal wire is of uniform color.

9. The component of claim 1, wherein each of said at least one ferrous metal wire is of uniform chemical composition.

10. The component of claim 1, wherein said component is selected from the group consisting of gears and bearings.

11. The component of claim 1, wherein said component comprises a non-ferrous substance selected from the group consisting of titanium, bronze, aluminum, nylon, composites, PEEK plastics, brass and magnesium, and combinations thereof.

12. A method of magnetically detecting thermal degradation of components comprising the steps of:
applying a thermally-affected adhesive to a surface of said component wherein said thermally-affected adhesive breaks down at temperature threshold;
attaching a plurality of ferrous metal wires to said component via said thermally-affected adhesive;
detecting the detachment of at least one of said plurality of ferrous metal wires detached from said component with a magnetic detector; and
said plurality of ferrous metal wires having a length sufficient so as not to be burned off by a fuzz burn feature of said magnetic detector.

13. The method of claim 12, wherein said at least one of said plurality of ferrous me al wires is detached from said component as the result of said breakdown of said thermally-affected adhesive.

14. The method of claim 13, comprising the additional steps of constructing said component of a non-ferrous substance selected from the group consisting of titanium, bronze, aluminum, nylon, composites, PEEK plastics, brass and magnesium, and combinations thereof.

15. A helicopter, comprising:
at least one module comprising at least one gearbox component, comprising:
a thermally-affected adhesive applied to a surface of said gearbox component; and
at least one ferrous metal wire attached to said surface of said gearbox by said thermally-affected adhesive.

16. The helicopter of claim 15, wherein said at least one ferrous metal wire is length sufficient to be detected by a magnetic detector.

17. The helicopter of claim 15, wherein said at least one ferrous metal wire is of a length sufficient so as not to be burned off by a fuzz burn feature of said magnetic detector.

18. The gearbox component of claim 15, wherein said at least one ferrous metal wire is between 0.05 and 0.15 inches in length.

19. The gearbox component of claim 16, wherein said at least one ferrous metal wire is between 0.07 and 0.13 inches in length.

20. The gearbox component of claim 15, wherein a diameter of said at least one ferrous metal wire is between 0.003 and 0.020 inches.

21. The gearbox component of claim 15, wherein a diameter of said at least one ferrous metal wire is between 0.010 and 0.015 inches.

22. The gearbox of claim 15, wherein each of said at least one ferrous metal wire is of uniform length.

23. The gearbox component of claim 15, wherein each of said at least one ferrous metal wire is of uniform diameter.

24. The gearbox component of claim 15, wherein each of said at least one ferrous metal wire is of uniform color.

25. The gearbox component of claim 15, wherein each of said at least one ferrous metal wire is of uniform chemical composition.

26. The gearbox component of claim 15, wherein said gearbox component is selected from the group consisting of gears and bearings.

27. The gearbox component of claim 15, wherein said gearbox component comprises a non-ferrous substance selected from the group consisting of titanium, bronze, aluminum, nylon, composites, PEEK plastics, brass and magnesium, and combinations thereof.

* * * * *